United States Patent
Gorantla et al.

(10) Patent No.: US 12,250,039 B1
(45) Date of Patent: Mar. 11, 2025

(54) APPARATUS AND METHOD FOR A COMMUNICATION SYSTEM

(71) Applicant: Nokia Solutions and Networks Oy, Espoo (FI)

(72) Inventors: Bala Venkata Ramulu Gorantla, Bangalore (IN); Suresh Kalyanasundaram, Bangalore (IN); Shalini Gulati, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/802,443

(22) Filed: Aug. 13, 2024

(30) Foreign Application Priority Data

Aug. 14, 2023 (FI) ...................................... 20235913

(51) Int. Cl.
*H04B 7/06* (2006.01)
*H04L 5/00* (2006.01)
*H04W 24/10* (2009.01)

(52) U.S. Cl.
CPC ......... *H04B 7/0617* (2013.01); *H04L 5/0051* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 7,250,903 B1 * | 7/2007 | McDowell | ............. | H04K 3/228 |
| | | | | 342/357.59 |
| 10,031,234 B1 * | 7/2018 | Alexander | ............. | G01S 19/53 |
| 2002/0177427 A1 * | 11/2002 | Nadgauda | ............. | H04L 1/06 |
| | | | | 455/423 |
| 2007/0098048 A1 * | 5/2007 | Cairns | ............. | H04B 1/712 |
| | | | | 375/E1.032 |
| 2008/0130719 A1 * | 6/2008 | Bottomley | ............. | H04B 1/712 |
| | | | | 375/E1.032 |
| 2013/0039445 A1 * | 2/2013 | Hwang | ............. | H01Q 25/00 |
| | | | | 375/316 |
| 2013/0301454 A1 * | 11/2013 | Seol | ............. | H04B 7/0695 |
| | | | | 370/252 |
| 2014/0355707 A1 | 12/2014 | Kim et al. | | |
| 2016/0277086 A1 * | 9/2016 | Choi | ............. | H04B 7/0617 |
| 2017/0017394 A1 * | 1/2017 | Wang | ............. | H04L 1/1819 |

(Continued)

OTHER PUBLICATIONS

Office Action received for corresponding Finnish Patent Application No. 20235913, dated Jan. 9, 2024, 10 pages.

(Continued)

*Primary Examiner* — Hassan A Phillips
*Assistant Examiner* — Gautam Sharma
(74) *Attorney, Agent, or Firm* — Nokia Technologies Oy (57) ABSTRACT

An apparatus for a communication system, the apparatus comprising at least one processor, and at least one memory storing instructions that, when executed by the at least one processor, cause the apparatus to: determine a first measurement of first reference signals associated with a first analog beam used to receive the first reference signals, determine a second measurement of second reference signals associated with a second analog beam used to receive the second reference signals, determine first information characterizing a digital beamformer based on the first measurement and the second measurement.

10 Claims, 7 Drawing Sheets

(56) References Cited

U.S. PATENT DOCUMENTS

| | | |
|---|---|---|
| 2018/0145737 A1 | 5/2018 | Rahman et al. |
| 2018/0227928 A1 | 8/2018 | Kim et al. |
| 2020/0052744 A1* | 2/2020 | Zhang .................. H04W 72/23 |
| 2021/0050893 A1 | 2/2021 | Park et al. |
| 2021/0083737 A1* | 3/2021 | Capdevielle ......... H04B 7/0452 |
| 2021/0243703 A1* | 8/2021 | Wolf ..................... H04L 5/0094 |
| 2022/0094414 A1 | 3/2022 | Raghavan et al. |
| 2022/0182117 A1* | 6/2022 | Thiagarajan ........... H04B 7/086 |
| 2022/0279535 A1* | 9/2022 | Tsui .................... H04L 25/0222 |
| 2024/0080084 A1* | 3/2024 | Sun ..................... H04B 7/06966 |

OTHER PUBLICATIONS

Office Action received for corresponding Finnish Patent Application No. 20235913, dated Jun. 20, 2024, 5 pages.
Extended European Search Report received for corresponding European Patent Application No. 24192730.0, dated Jan. 7, 2025, 10 pages.

* cited by examiner

APPARATUS AND METHOD FOR A COMMUNICATION SYSTEM

RELATED APPLICATION

This application claims benefit of priority from Finnish Patent App. No. 20235913, filed Aug. 14, 2023, the disclosure of which is hereby incorporated in its entirety by reference herein.

FIELD OF THE DISCLOSURE

Various example embodiments relate to an apparatus for a communication system.

Further embodiments relate to a method for a communication system.

BACKGROUND

Communication systems such as, e.g., wireless communication systems may be used for wireless exchange of information between two or more entities, e.g., comprising one or more terminal device, e.g., user equipment (UE), and one or more network devices such as, e.g., base stations.

In some conventional wireless communication systems, beamforming is applied, e.g., to enhance a quality and/or efficiency of radio transmissions. In some conventional approaches, by combining multiple antenna elements, beamforming may be used to focus transmitted signals in a specific direction, thereby e.g. increasing signal strength, reducing interference, and improving overall system performance.

In some conventional communication systems, beamforming may be based on reference signals exchanged between devices of the communication system, e.g., between a terminal device and a network device.

In some conventional approaches, analog beamforming is used, analog beamforming denoting a technique for manipulating a phase and/or amplitude of signals in the analog domain, e.g., using phase shifters and/or attenuators and the like, e.g., to control a directionality and/or characteristics of transmitted and/or received beams.

In some conventional approaches, digital beamforming is used, digital beamforming denoting a technique for manipulating a phase and/or amplitude of signals in the digital domain, e.g., to control a directionality and/or characteristics of transmitted and/or received beams.

In some conventional approaches, hybrid beamforming is proposed, using a combination of digital beamforming and analog beamforming.

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Exemplary embodiments relate to an apparatus for a communication system, the apparatus comprising at least one processor, and at least one memory storing instructions that, when executed by the at least one processor, cause the apparatus to: determine a first measurement of first reference signals associated with a first analog beam used to receive the first reference signals, determine a second measurement of second reference signals associated with a second analog beam used to receive the second reference signals, determine first information characterizing a digital beamformer based on the first measurement and the second measurement. In some embodiments, the first information may, e.g., be used for performing digital beamforming.

In some embodiments, the communication system may be a wireless communication system.

In some embodiments, the wireless communication system may adhere to and/or may be based on some accepted (and/or planned) standard, such as, e.g. 3G, 4G, 5G, 6G, or some other wireless communication standard.

In some embodiments, the apparatus may be an apparatus for a network device, e.g., a base station, e.g., a gNB.

In some embodiments, the apparatus or its functionality, respectively, may be provided within the network device. In some other embodiments, the apparatus or its functionality may be provided outside of the network device.

In some embodiments, the apparatus may be an apparatus for a terminal device, e.g., a user equipment (UE).

In some embodiments, the apparatus or its functionality, respectively, may be provided within the terminal device. In some other embodiments, the apparatus or its functionality may be provided outside of the terminal device.

In some embodiments, the apparatus may be configured to perform hybrid beamforming, the hybrid beamforming comprising aspects of digital beamforming and of analog beamforming.

In some embodiments, the first analog beam used to receive the first reference signals may e.g. be attained by means of the analog beamforming. Similarly, the second analog beam used to receive the second reference signals may e.g. also be attained by means of the analog beamforming.

In some embodiments, the first and second reference signals may e.g. be sounding reference signals, e.g. according to some accepted standard, e.g. Sounding Reference Signals (SRS) according to a 5G or 6G standard.

Note that, in some embodiments, the first reference signals may comprise at least one reference signal. In other words, the "first reference signals" as used herein may e.g. comprise one or more reference signals, e.g. one or more first reference signals. Similarly, in some embodiments, the second reference signals may comprise at least one reference signal. In other words, the "second reference signals" as used herein may e.g. comprise one or more reference signals, e.g. one or more second reference signals.

In some embodiments, the first measurement and the second measurement are consecutive measurements. In other words, in some embodiments, no further measurements associated with reference signals, e.g., SRS, are performed between the first measurement and the second measurement.

In some embodiments, a time duration between the first measurement and the second measurement may be an SRS period, e.g. according to some accepted standard.

In some embodiments, the instructions, when executed by the at least one processor, cause the apparatus to: perform digital beamforming using the digital beamformer in a first direction, perform analog beamforming in a second direction, which is different from the first direction.

In some embodiments, digital beamforming is e.g. performed in a horizontal direction, and analog beamforming is e.g. performed in a vertical direction.

In some other embodiments, both digital beamforming and analog beamforming may, e.g. also, be done in the vertical direction.

As an example, in some embodiments, four comparatively narrow analog beams may be used in the vertical direction, wherein, for example, each of the analog beams is associated with another elevation angle.

In some embodiments, the instructions, when executed by the at least one processor, cause the apparatus to: determine a measurement vector characterizing the first and second reference signals based on the first measurement and the second measurement, determine a first covariance matrix based on the measurement vector, determine a second covariance matrix, which is associated with at least one of the first analog beam and the second analog beam, based on first covariance matrix, wherein, for example, the second covariance matrix is determined for any analog beam, e.g., including the first analog beam and the second analog beam.

In some embodiments, the instructions, when executed by the at least one processor, cause the apparatus to perform at least one of: a) determining the measurement vector in accordance with $Z_{SRS}=(w^H w)^{-1} w^H y$, wherein $Z_{SRS}$ characterizes the measurement vector, wherein $$y = \begin{bmatrix} y_i \\ y_k \end{bmatrix},$$

wherein $y_i$ characterizes the first measurement of the first reference signals associated with the first analog beam, wherein $y_k$ characterizes the second measurement of the second reference signals associated with the second analog beam, wherein $$w = \begin{bmatrix} w_i \\ w_k \end{bmatrix},$$

wherein $w_i$ characterizes a weight matrix associated with the first analog beam, wherein $w_k$ characterizes a weight matrix associated with the second analog beam, wherein $w^H$ is the conjugate transpose of w, wherein $(\ )^{-1}$ characterizes a matrix inversion, b) determining the first covariance matrix based on the measurement vector in accordance with: $R_{zz}=Z_{SRS}Z_{SRS}^H$, wherein $R_{zz}$ characterizes the first covariance matrix, c) determining the second covariance matrix based on first covariance matrix in accordance with:

$$R_{y_i y_i} = w_i R_{zz} w_i^H,$$

wherein $R_{y_i y_i}$ Characterizes the covariance matrix associated with the at least one of the first analog beam and the second analog beam, wherein, for example, the second covariance matrix is determined for any analog beam, e.g., including the first analog beam and the second analog beam.

In some embodiments, the instructions, when executed by the at least one processor, cause the apparatus to perform at least one of: a) determining, based on the first information, a digital beam for exchanging, for example transmitting and/or receiving, signals, b) exchanging, for example transmitting and/or receiving, signals using the digital beam, c) updating the digital beam.

In some embodiments, control signals, e.g. control signals according to some accepted standard, may be exchanged using the digital beam (and/or a respective analog beam).

As an example, in some embodiments, at least one of a) signals associated with a Physical Downlink Shared Channel, PDSCH, and/or b) signals associated with a Physical Uplink Shared Channel, PUSCH, e.g., according to some accepted standard, may be transmitted and/or received using the digital beam (and/or a respective analog beam).

In some embodiments, the instructions, when executed by the at least one processor, cause the apparatus to: determine an estimate of a measurement vector based on the first measurement and the second measurement, determine a first covariance matrix for the estimate based on the estimate, determine a second covariance matrix related to the estimate, which is associated with one of the first analog beam and the second analog beam, based on the first covariance matrix for the estimate.

In some embodiments, the instructions, when executed by the at least one processor, cause the apparatus to perform at least one of: a) determining an accuracy of the estimate of the measurement vector, e.g., based on a normalized mean square error (NMSE), b) determining an accuracy of the second covariance matrix related to the estimate, e.g., based on an NMSE.

Some embodiments relate to an apparatus for a communication system, the apparatus comprising means for determining a first measurement of first reference signals associated with a first analog beam used to receive the first reference signals, determining a second measurement of second reference signals associated with a second analog beam used to receive the second reference signals, determining first information characterizing a digital beamformer based on the first measurement and the second measurement.

In some embodiments, the means for determining the first measurement and the second measurement and for determining the first information may, e.g., comprise at least one processor, and at least one memory storing instructions that, when executed by the at least one processor, cause the apparatus to perform the aforementioned aspects.

In some embodiments, the means for determining the first measurement and the second measurement and for determining the first information may, e.g., comprise circuitry configured to perform the aforementioned aspects.

Some embodiments relate to a network device, e.g., base station, e.g., gNB, for a communication system comprising at least one apparatus according to the embodiments.

Some embodiments relate to a terminal device, e.g., UE, for a communication system comprising at least one apparatus according to the embodiments.

Some embodiments relate to a communication system comprising at least one of: a) an apparatus according to the embodiments, and/or b) a network device according to the embodiments, and/or c) a terminal device according to the embodiments.

Some embodiments relate to a method for a communication system, comprising: determining a first measurement of first reference signals associated with a first analog beam used to receive the first reference signals, determining a second measurement of second reference signals associated with a second analog beam used to receive the second reference signals, determining first information characterizing a digital beamformer based on the first measurement and the second measurement.

Further embodiments relate to a computer program comprising instructions which, when the program is executed by a computer, cause the computer to carry out at least some aspects of the method according to the embodiments.

DESCRIPTION OF SOME EXEMPLARY EMBODIMENTS

Figure 1A:
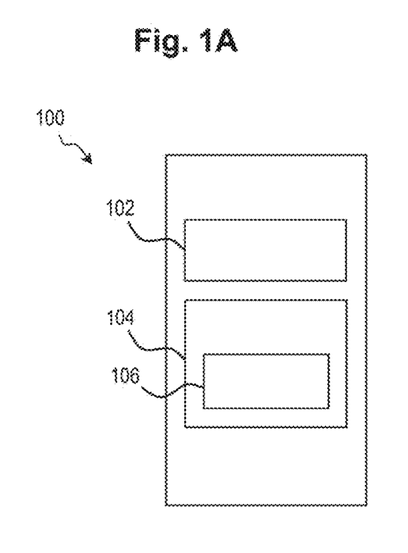
FIG. 1A schematically depicts a simplified block diagram according to some embodiments, FIG. 1B schematically depicts a simplified block diagram according to some embodiments, FIG. 2 schematically depicts a simplified block diagram according to some embodiments, FIG. 3 schematically depicts a simplified flow chart according to some embodiments, FIG. 4 schematically depicts a simplified flow chart according to some embodiments, FIG. 5 schematically depicts a simplified signaling diagram according to some embodiments, FIG. 6 schematically depicts a simplified block diagram according to some embodiments, FIG. 7 schematically depicts a simplified flow chart according to some embodiments, FIG. 8 schematically depicts a simplified flow chart according to some embodiments, FIG. 9 schematically depicts a simplified flow chart according to some embodiments, FIG. 10 schematically depicts a simplified flow chart according to some embodiments, FIG. 11 schematically depicts a simplified block diagram according to some embodiments.
Figure 2:
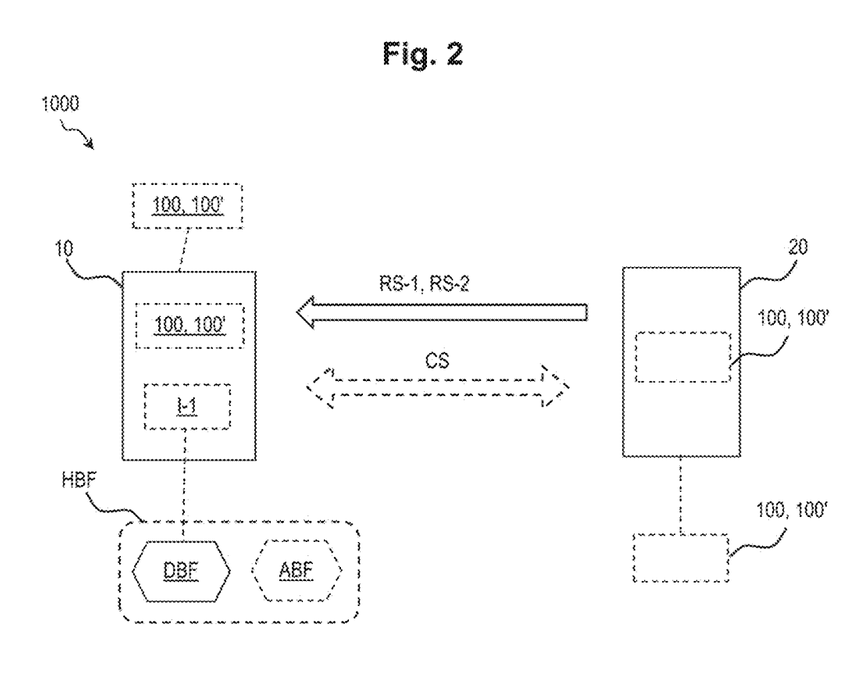
Figure 3:
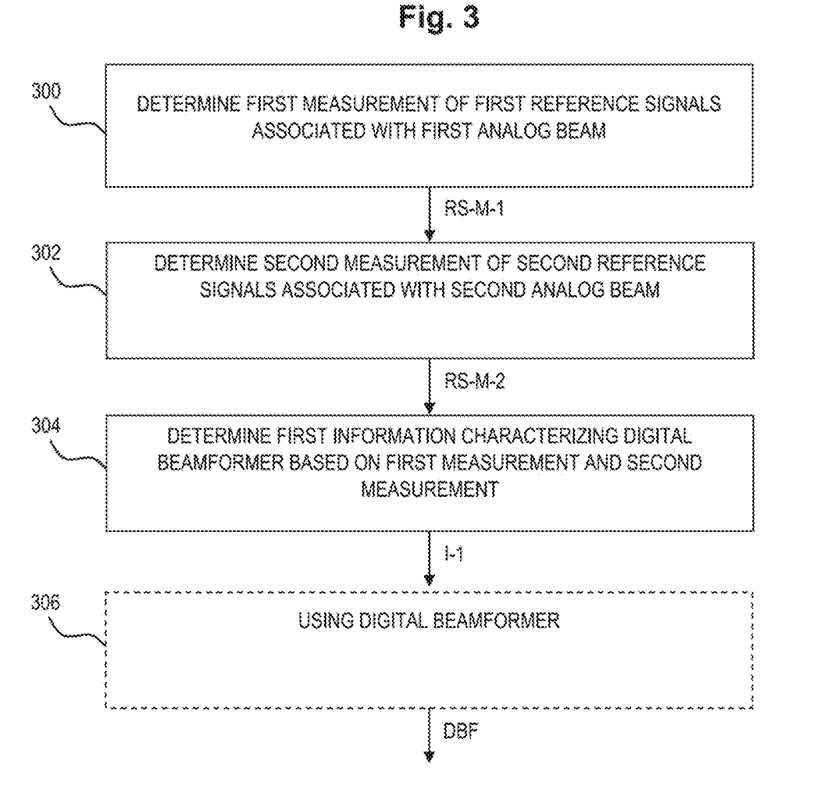

Some embodiments, see, for example, FIG. 1A, 2, 3, relate to an apparatus 100 (FIG. 1A) for a communication system 1000 (FIG. 2), the apparatus 100 comprising at least one processor 102 (FIG. 1A), and at least one memory 104 storing instructions 106 that, when executed by the at least one processor 102, cause the apparatus 100 to: determine 300 (FIG. 3) a first measurement RS-M-1 of first reference signals associated with a first analog beam 1 (see FIG. 5) used to receive the first reference signals, determine 302 (FIG. 3) a second measurement RS-M-2 of second reference signals associated with a second analog beam 2 (FIG. 5) used to receive the second reference signals, determine 304 (FIG. 3) first information I-1 characterizing a digital beamformer DBF based on the first measurement RS-M-1 and the second measurement RS-M-2. In some embodiments, the first information I-1 may, e.g., be used for performing aspects of digital beamforming, see, for example, the optional block 306.

In some embodiments, FIG. 2, the communication system 1000 may be a wireless communication system.

In some embodiments, the wireless communication system 1000 may adhere to and/or may be based on some accepted (and/or planned) standard, such as, e.g. 3G, 4G, 5G, 6G, or some other wireless communication standard.

In some embodiments, FIG. 2, the apparatus 100 may be an apparatus for a network device 10, e.g., a base station, e.g., a gNB.

In some embodiments, the apparatus 100 or its functionality, respectively, may be provided within the network device 10. In some other embodiments, the apparatus 100 or its functionality may be provided outside of the network device 10. Both exemplary variants are symbolized by dashed rectangles 100 in FIG. 2.

In some embodiments, FIG. 2, the apparatus 100 may be an apparatus for a terminal device 10, e.g., a user equipment (UE).

In some embodiments, the apparatus 100 or its functionality, respectively, may be provided within the terminal device 20. In some other embodiments, the apparatus 100 or its functionality may be provided outside of the terminal device 20. However, for the sake of clarity, and without loss of generality, the following exemplary disclosure focuses on exemplary embodiments wherein the apparatus 100 or its functionality, respectively, is provided for and/or within a network device 10, such as a gNB.

In some embodiments, FIG. 2, the apparatus 100 may be configured to perform hybrid beamforming, see the exemplary block HBF of FIG. 2, the hybrid beamforming HBF comprising aspects of digital beamforming, see the exemplary block DBF, and of analog beamforming, see the exemplary block ABF.

In some embodiments, the first analog beam 1 (FIG. 5) used to receive the first reference signals RS-1 may e.g. be attained by means of analog beamforming ABF. Similarly, the second analog beam 2 used to receive the second reference signals RS-2 may e.g. also be attained by means of the analog beamforming ABF.

In some embodiments, FIG. 2, the first and second reference signals RS-1, RS-2 may e.g. be sounding reference signals, e.g. according to some accepted standard, e.g. Sounding Reference Signals (SRS) according to a 5G or 6G standard.

In some embodiments, FIG. 3, the first measurement RS-M-1 and the second measurement RS-M-2 are consecutive measurements. In other words, in some embodiments, no further measurements associated with reference signals, e.g., SRS, are performed between the first measurement RS-M-1 and the second measurement RS-M-2.

Figure 5:
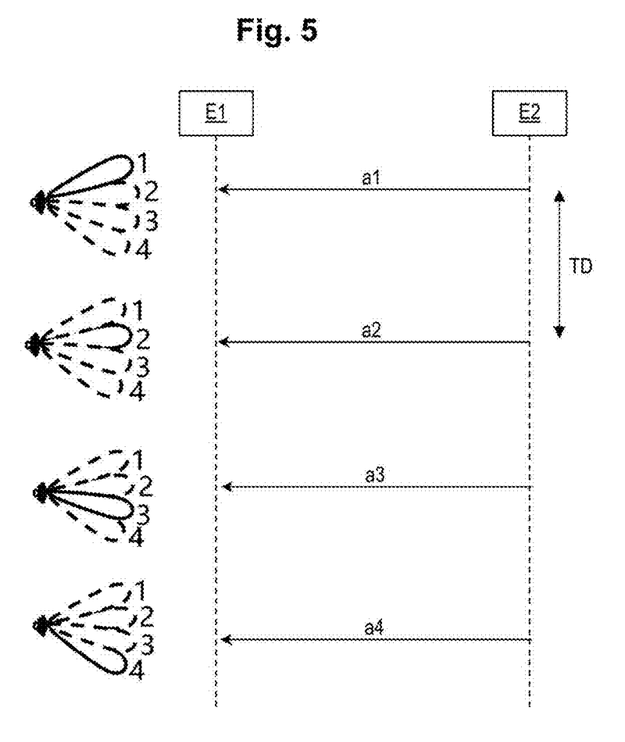

FIG. 5 illustrates an exemplary scenario, wherein element E1 symbolizes a gNB (see, for example, also block 10 of FIG. 2), wherein element E2 symbolizes a UE (see, for example, also block 20 of FIG. 2). The arrows a1, a2, a3, a4 symbolize respective reference signals, e.g. SRS, transmitted, for example periodically, by the UE E2 to the gNB E1. SRS according to arrow a1 are for example received by the gNB E1 using the first analog beam 1, wherein SRS according to arrow a2 are for example received by the gNB E1 using the second analog beam 2. Optionally, further SRS a3, a4 may be received by the gNB E1 using further analog beams 3, 4.

As an example, the SRS transmission a1 of FIG. 5 may e.g. correspond with the first reference signals RS-1 of FIG. 2, and the SRS transmission a2 of FIG. 5 may e.g. correspond with the second reference signals RS-2 of FIG. 2.

In some embodiments, FIG. 5, a time duration TD between the first measurement and the second measurement may be an SRS period, e.g. according to some accepted standard.

Figure 4:
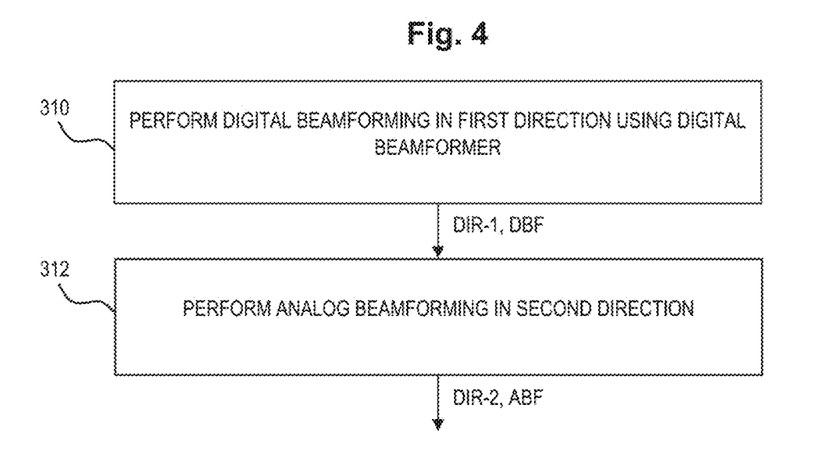

In some embodiments, FIG. 4, the instructions, when executed by the at least one processor, cause the apparatus 100 to: perform 310 digital beamforming using the digital beamformer DBF in a first direction DIR-1, perform 312 analog beamforming ABF in a second direction DIR-2, which is different from the first direction DIR-1.

In some embodiments, digital beamforming DBF is e.g. performed in a horizontal direction, and analog beamforming ABF is e.g. performed in a vertical direction (e.g., associated with an elevation).

In some other embodiments, both digital beamforming and analog beamforming may also be done in the vertical direction.

As an example, in some embodiments, FIG. 5, four comparatively narrow analog beams 1, 2, 3, 4 may be used in the vertical direction, wherein, for example, each of the analog beams 1, 2, 3, 4 is associated with another elevation angle.

Figure 6:
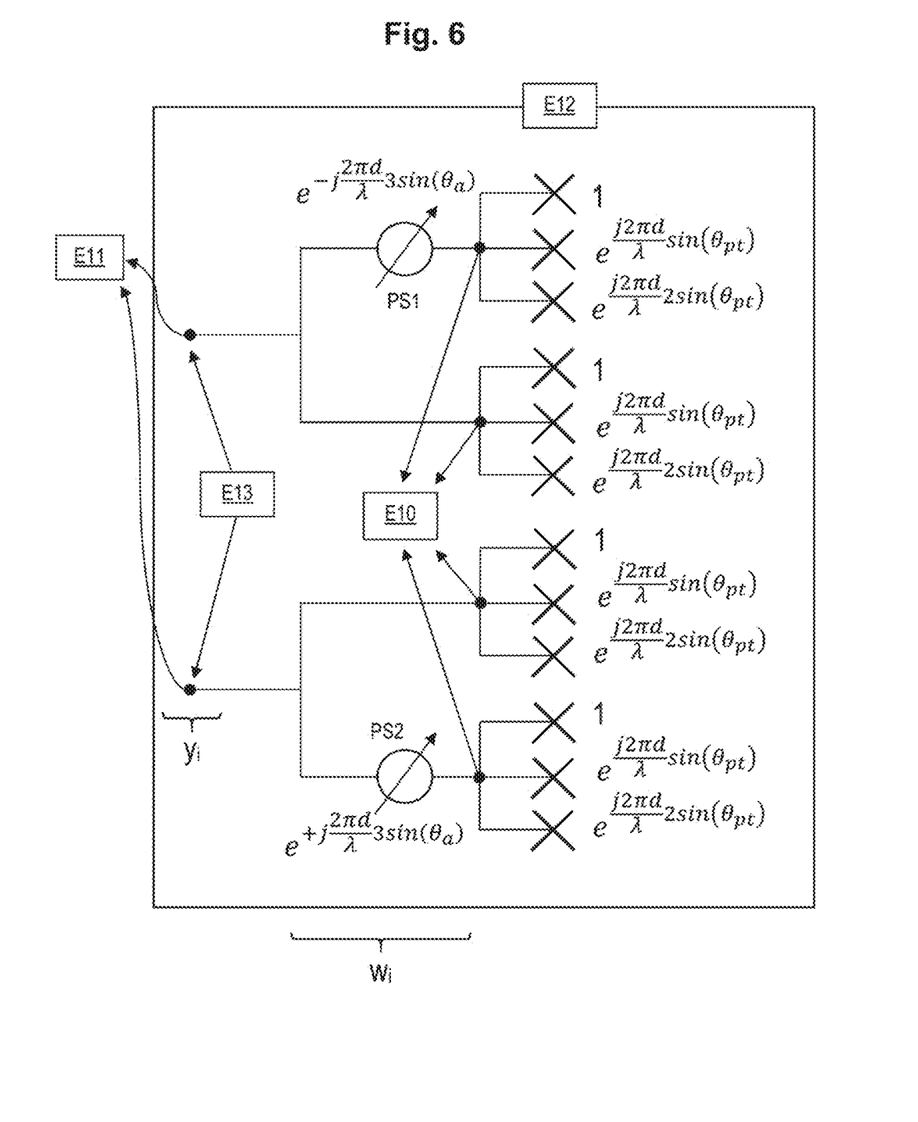

FIG. 6 exemplarily depicts aspects of signal processing related to measurements associated with received SRS in some embodiments, wherein a configuration as may be used for one column of a hybrid beamformer architecture, see block HBF of FIG. 2, is depicted. Element E10 symbolizes inputs before application of analog phase shifters of an analog beamformer (see block ABF of FIG. 2), element E11 symbolizes respective channels through the analog beamformer, element E12 symbolizes weights of analog phase shifters of the analog beamformer, and element E13 symbolizes digital ports, e.g. inputs.

As an example, when reference signals such as SRS are received, they are processed by the exemplary configuration of FIG. 6 in a substantially horizontal direction from the right side of FIG. 6 to the left side of FIG. 6, e.g. undergoing at least one of: a) analog phase shifting, if any, b) combining, c) amplification, d) analog-to-digital conversion.

Figure 11:
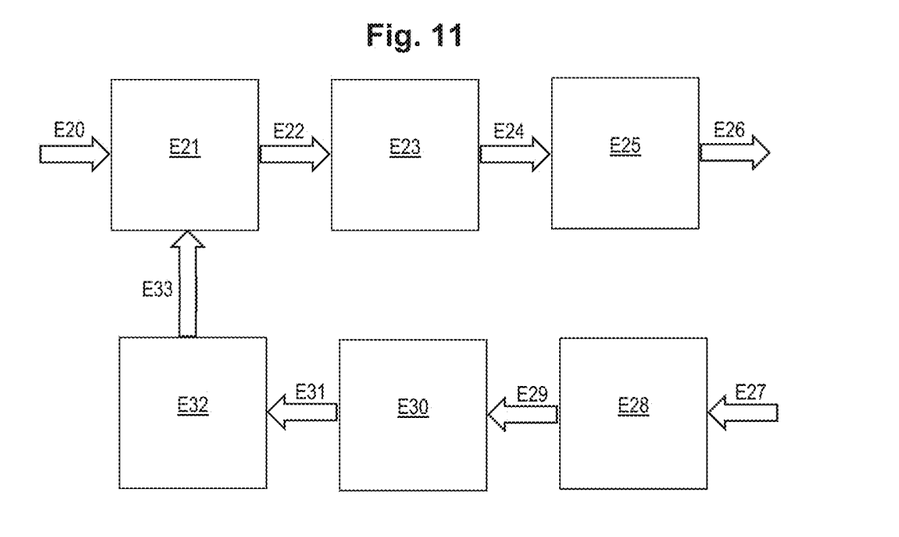

FIG. 11 exemplarily depicts aspects of signal processing related to measurements associated with received SRS in some embodiments. Element E20 symbolizes user layers, e.g. associated with user data to be transmitted, element E21 symbolizes a digital beamforming, element E22 symbolizes digital Transmit/Receive Chain ("TRX") streams obtained by the digital beamforming E21. Element E23 symbolizes analog beamforming, e.g. by applying a chosen phase shifter weight, and element E24 symbolizes analog streams as obtained by the analog beamforming E23. Element E25 symbolizes a pre-tilt application, e.g., characterizing a phase shifter-to-radiator mapping, and element E26 symbolizes radiator streams.

Element E27 symbolizes SRS signals, element E28 symbolizes a pre-tilt application, e.g., similar to element E25, e.g., characterizing a phase shifter-to-radiator mapping (for a receive direction). Element E29 symbolizes analog streams in a receive direction, element E30 symbolizes analog beamforming, e.g., by applying a chosen phase shifter weight. Element E31 symbolizes digital TRX streams, element E32 symbolizes a determination of a respective covariance matrix, e.g., according to the principle of the embodiments, and element E33 symbolizes digital weights as e.g. obtained by the determination block E32. In some embodiments, FIG. 7, the instructions, when executed by the at least one processor, cause the apparatus 100 to: determine 320 a measurement vector MV characterizing the first and second reference signals RS-1, RS-2 (FIG. 2) based on the first measurement RS-M-1 and the second measurement RS-M-2, determine 322 (FIG. 7) a first covariance matrix CV-M-1 based on the measurement vector MV, determine 324 a second covariance matrix CV-M-2, which is associated with at least one of the first analog beam 1 (FIG. 5) and the second analog beam 2, based on first covariance matrix CV-M-1, wherein, for example, the second covariance matrix CV-M-2 is determined for any analog beam, e.g., including the first analog beam 1 and the second analog beam 2. The optional block 326 of FIG. 7 symbolizes an optional determination of the first information I-1 characterizing the digital beamformer DBF based on the second covariance matrix CV-M-2.

Figure 7:
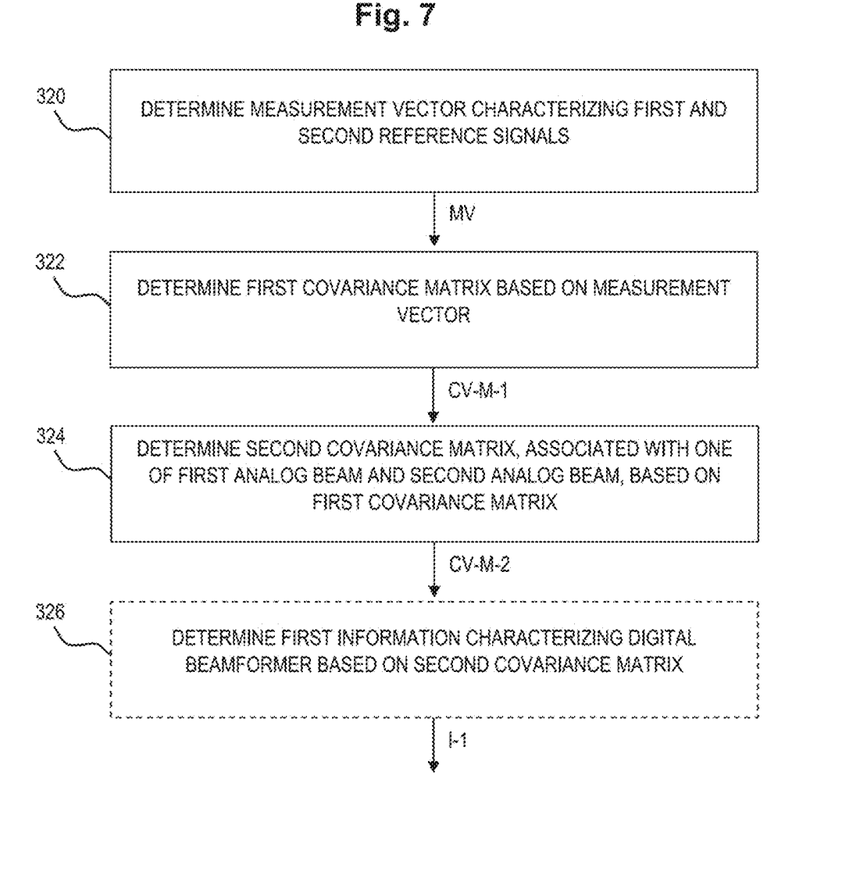

In some embodiments, FIG. 7, the instructions, when executed by the at least one processor, cause the apparatus 100 to perform determining 320 the measurement vector MV in accordance with $Z_{SRS}=(w^H w)^{-1} w^H y$, wherein $Z_{SRS}$ characterizes, e.g., denotes, the measurement vector MV, wherein $$y = \begin{bmatrix} y_i \\ y_k \end{bmatrix},$$

wherein $y_i$ characterizes the first measurement RS-M-1 (FIG. 3) of the first reference signals RS-1 (FIG. 2) associated with the first analog beam 1 (FIG. 5), wherein $y_k$ characterizes the second measurement RS-M-2 (FIG. 3) of the second reference signals RS-2 (FIG. 2) associated with the second analog beam 2 (FIG. 5), wherein $$w = \begin{bmatrix} w_i \\ w_k \end{bmatrix},$$

wherein $w_i$ characterizes a weight matrix (e.g., as usable by block E12 of FIG. 6) associated with the first analog beam 1, wherein $w_k$ characterizes a weight matrix associated with the second analog beam, wherein $w^H$ is the conjugate transpose of w, wherein $(\ )^{-1}$ characterizes a matrix inversion.

In some embodiments, FIG. 7, the instructions, when executed by the at least one processor, cause the apparatus 100 to perform determining 322 (FIG. 7) the first covariance matrix CV-M-1 based on the measurement vector MV in accordance with: $R_{zz}=Z_{SRS}Z_{SRS}^H$, wherein $R_{zz}$ characterizes the first covariance matrix CV-M-1. In some embodiments, FIG. 7, the instructions, when executed by the at least one processor, cause the apparatus 100 to perform determining 324 the second covariance matrix CV-M-2 based on first covariance matrix CV-M-1 in accordance with:

$$R_{y_i y_i} = w_i R_{zz} w_i^H,$$

wherein $R_{y_i y_i}$ characterizes the second covariance matrix CV-M-2. In some embodiments, the second covariance matrix CV-M-2 may be determined for any analog beam, e.g., including the first analog beam 1 and the second analog beam 2.

In the following, further exemplary aspects and exemplary embodiments are disclosed, which, in some embodiments, may be combined with each other and/or with at least one of the aforementioned aspects.

In some embodiments, two consecutive sets of SRS measurements, e.g., reference signals RS-1, RS-2 (FIG. 2), observed through different analog beams 1, 2 (FIG. 5) are used to determine the first information I-1 and/or a corresponding digital beamformer as described below.

In some embodiments, let $y_i$ be an SRS measurement vector after the analog beam i is applied, wherein $y_i$ is of size $N_T \times 1$ where $N_T$ is a number of digital transmit/receive chains ("TRXs") as e.g. used for receiving the SRS.

In some embodiments, let $Z_{SRS}$ be an SRS measurement vector (e.g., at least similar to measurement vector MV of FIG. 7), before an analog phase (e.g., phase shift) is applied, wherein $Z_{SRS}$ is of size $N_T N_P \times 1$ where $N_P$ is a number of phase shifters as e.g. used for receiving the SRS.

In some embodiments, let $w_i$ be a weight matrix corresponding to the analog beam i, wherein $w_i$ is of size $N_T \times N_T N_P$.

In some embodiments, a relation between $y_i$ and $Z_{SRS}$ is given by $y_i = w_i Z_{SRS}$.

In some embodiments, a first aspect ("Step 1") may comprise one or more of the following aspects: Determine $Z_{SRS}$ from $y_i$ received SRS measurements. In some examples, one measurement of $y_i$ may not be sufficient to determine $Z_{SRS}$ because it forms an under-determined system to solve for $Z_{SRS}$. However, in some embodiments, by taking two measurements $y_i$ and $y_k$ (i≠k) (e.g., two different measurements), e.g. corresponding to two different analog beams i and k (for example analog beam 1 and analog beam 2 of FIG. 5), a well determined system may be obtained, where $y_i = w_i Z_{SRS}$ and $y_k = w_k Z_{SRS}$. In some embodiments, solving for $Z_{SRS}$ using $y_i$ and $y_k$ in accordance with $$Z_{SRS} = (w^H w)^{-1} w^H y,$$

where $$w = \begin{bmatrix} w_i \\ w_k \end{bmatrix}$$

and $$y = \begin{bmatrix} y_i \\ y_k \end{bmatrix}$$

can be performed. Note that this is one exemplary method of obtaining $Z_{SRS}$ from $y_i$ and $y_k$ according to some embodiments. In some embodiments, the exemplarily depicted principle and the subsequent approach according to exemplary embodiments works for, e.g. any, other method of equation solving also.

Note that in some embodiments, e.g., when w is full rank, a pseudo-inverse $(w^H w)^{-1} w^H$ reduces to $w^{-1}$.

In some embodiments, a second aspect ("Step 2") may comprise one or more of the following aspects: In some embodiments, $Z_{SRS}$ may be used to determine, e.g. compute, a covariance matrix $R_{zz}$ corresponding to $Z_{SRS}$ as $R_{zz} = Z_{SRS} Z_{SRS}^H$.

In some embodiments, a third aspect ("Step 3") may comprise one or more of the following aspects: In some embodiments, the covariance matrix $R_{y_i y_i}$ corresponding to $y_i$ of any analog beam i may be determined as $$\begin{aligned} R_{y_i y_i} &= y_i y_i^H \\ &= w_i Z_{SRS} Z_{SRS}^H w_i^H \text{ (e.g., substituting for } y_i) \\ &= w_i R_{zz} w_i^H. \end{aligned}$$

In some embodiments, e.g., subsequently, $R_{y_i y_i}$ may be used, e.g., to determine a digital beam (e.g., DIG-B, see FIG. 8), which, in some embodiments, may be used, e.g., for exchange of signals, e.g., PDSCH transmission and/or PUSCH reception.

In some embodiments, the digital beam thus determined may be used for PDSCH transmission and/or PUSCH reception, e.g. in between reception of subsequent SRS measurements, and can e.g. be updated, e.g. when SRS measurements are received in a next period, e.g., SRS period.

In some embodiments, at least temporarily storing $Z_{SRS}$ may allow for determination of a digital beamformer independent of a (e.g., currently) best analog beam of a UE 20, thus e.g. alleviating a need to store a covariance matrix for each analog beam, as according to some conventional approaches.

In some embodiments, the principle according to the embodiments may be used for a static channel as well as for a time varying channel, over which the reference signals may be received.

In some embodiments, in a case of a static channel, the channel through which the SRS is exchanged (e.g., transmitted, e.g. by the UE 20 to the gNB 10) does not change across two SRS receptions. In this case, in some embodiments, the first information I-1 and/or $Z_{SRS}$ may be determined accurately, consequently $R_{zz}$ and $R_{y_i y_i}$ also.

Figure 8:
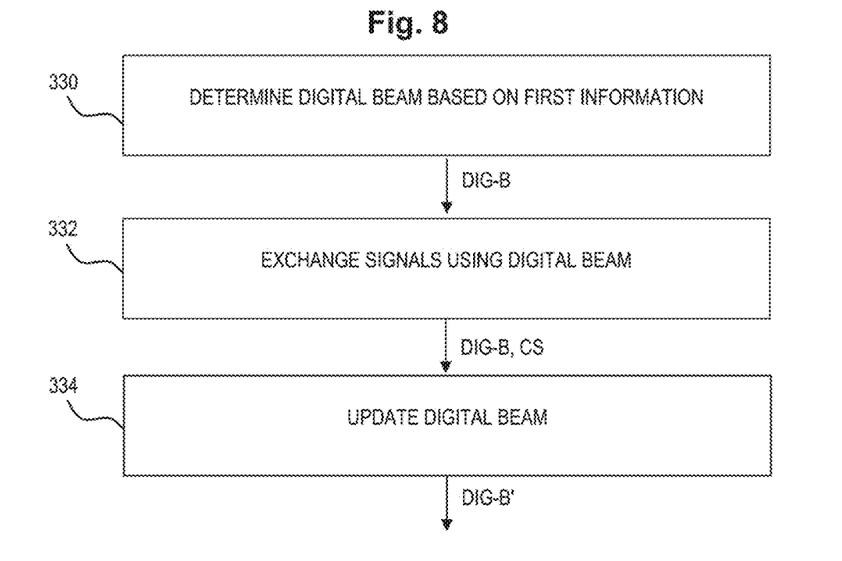

In some embodiments, FIG. 8, the instructions, when executed by the at least one processor, cause the apparatus 100 to perform at least one of: a) determining 330, based on the first information I-1, a digital beam DIG-B for exchanging 332, for example transmitting and/or receiving, signals, b) exchanging 332, for example transmitting and/or receiving, signals CS using the digital beam DIG-B, c) updating 334 the digital beam DIG-B, e.g. based on further measurements, e.g. SRS measurements, e.g. after a subsequent SRS period, whereby an updated digital beam DIG-B' may be obtained. In some embodiments, the updated digital beam DIG-B' may be used for exchanging signals, e.g., similar to block 332 of FIG. 8.

In some embodiments, control signals, e.g. control signals according to some accepted standard, may be exchanged using the digital beam (and/or a respective analog beam). In other words, the signals CS that may be exchanged according to block 332 of FIG. 8 may be control signals.

As an example, in some embodiments, at least one of a) signals associated with a Physical Downlink Shared Channel, PDSCH, and/or b) signals associated with a Physical Uplink Shared Channel, PUSCH, e.g., according to some accepted standard, may be transmitted and/or received using the digital beam DIG-B (and/or a respective analog beam 1, 2, 3, or 4 (FIG. 5)).

Figure 9:
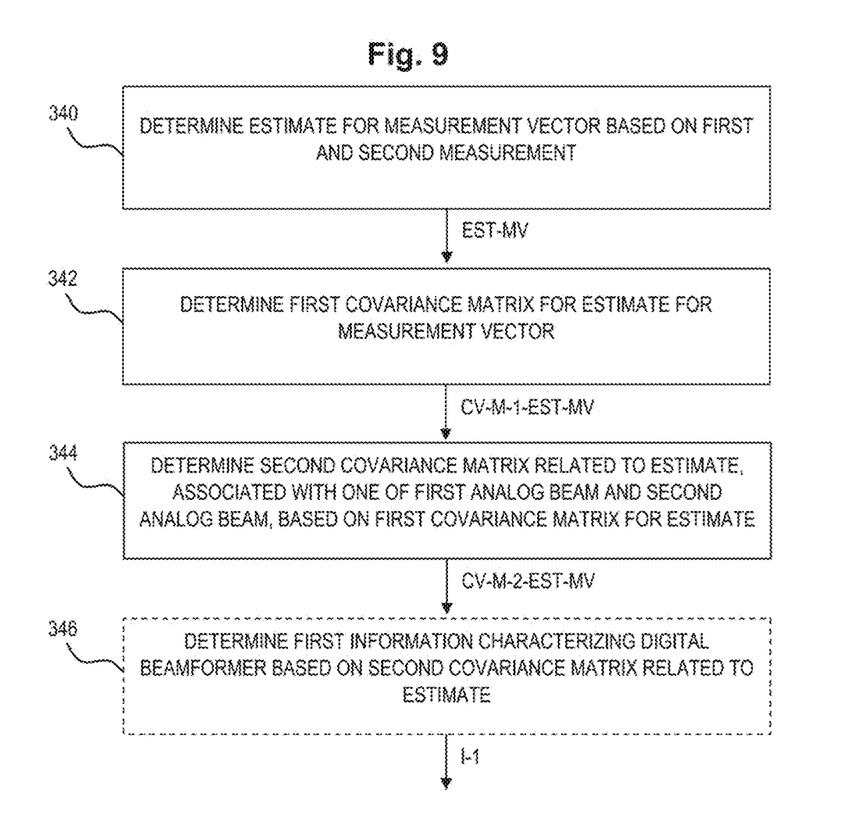

In some embodiments, FIG. 9, the instructions, when executed by the at least one processor, cause the apparatus 100 to: determine 340 an estimate EST-MV of a measurement vector MV based on the first measurement RS-M-1 and the second measurement RS-M-2, determine 342 a first covariance matrix CV-M-1-EST-MV for the estimate EST-MV based on the estimate EST-MV, determine 344 a second covariance matrix CV-M-2-EST-MV related to the estimate, which is associated with one of the first analog beam 1 and the second analog beam 2, based on the first covariance matrix CV-M-1-EST-MV for the estimate. In some embodiments, this process may e.g. be used when exchanging the reference signals RS-1, RS-2 through a time-varying channel. The optional block 346 symbolizes an optional determination of the first information I-1 based on the second covariance matrix CV-M-2-EST-MV.

In some embodiments, e.g., in a case of a time varying channel, the channel through which the SRS is transmitted varies, e.g., from one SRS transmission to subsequent SRS transmission. In some embodiments, this means that in two successive or consecutive SRS measurements as considered in some embodiments, the underlying $Z_{SRS}$ is not the same. However, in some embodiments, there may be some degree of correlation between the channels of successive SRS transmissions, i.e., the underlying $Z_{SRS}$ from the two respective consecutive measurements may have some degree of correlation between them.

Therefore, in some embodiments, a similar approach as exemplarily explained above with respect to embodiments associated with a static channel can be used.

In some embodiments, let $Z_{SRS,t}$ be an estimated SRS measurement at time t and $Z_{SRS,t+p}$ be an estimated SRS measurement at time t+p (e.g., at least similar to estimate EST-MV as obtained by block 340 of FIG. 9), e.g., before the analog beam is applied.

Note that in some embodiments, $Z_{SRS,t}$ or $Z_{SRS,t+p}$ cannot be directly determined, e.g. observed, because in some embodiments, the associated signals may, e.g. only, be measured/estimated after application of the analog beam weights.

In some embodiments, p may be the SRS transmission period, see, for example, element TD of FIG. 5. In some embodiments, let $y_{i,t}$ be an SRS measurement after analog beam i is applied at time t and $y_{k,t+p}$ be an SRS measurement after (another) analog beam k is applied at time t+p.

In some embodiments, e.g., from two successive measurements of $y_{i,t}$ and $y_{k,t+p}$, determine, e.g., estimate $Z_{SRS,t+p}$. In some embodiments, let $\hat{Z}_{SRS}$ be the estimate of $Z_{SRS,t+p}$. In some embodiments, determine, e.g., compute $\hat{R}_{zz}=\hat{Z}_{SRS}\hat{Z}_{SRS}^H$. In some embodiments, determine, e.g., compute $\hat{R}_{y_iy_i}=w_i\hat{R}_{zz}w_i^H$, e.g. for at least one, e.g. any, analog beam i.

In some embodiments, it is proposed to determine, e.g., compute a respective covariance matrix of one or more, for example all, analog beams in a current channel.

In some embodiments, e.g., since $Z_{SRS,t}$ and $Z_{SRS,t+p}$ are not same in a time varying channel, the estimate $\hat{Z}_{SRS}$ may contain an ingrained information of $Z_{SRS,t}$ (e.g., of the previous channel) with beam i and $Z_{SRS,t+p}$ (e.g., of the present channel) with beam k. Hence, in some embodiments, using $\hat{Z}_{SRS}$ one can efficiently determine, e.g. compute, $y_{k,t+p}$ and a corresponding covariance matrix $\hat{R}_{y_ky_k}$ (e.g., of the present channel). Also, in some embodiments, one can also determine, e.g. compute, $y_{i,t}$ and a corresponding covariance matrix $\hat{R}_{y_iy_i}$ (e.g., of the previous channel). However, in some embodiments, in the present channel slot t+p, $\hat{R}_{y_iy_i}$ (i≠k) may not be accurate, because $\hat{Z}_{SRS}$ may contain information of $Z_{SRS,t+p}$ with analog beam k, but not with analog beam i.

Figure 10:
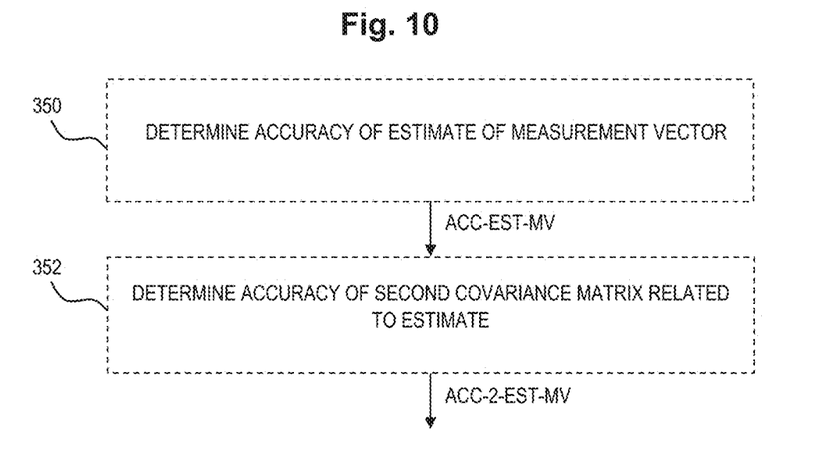

In view of this, in some embodiments, FIG. 10, the instructions, when executed by the at least one processor, cause the apparatus 100 to perform at least one of: a) determining 350 an accuracy ACC-EST-MV of the estimate EST-MV of the measurement vector, e.g., based on a normalized mean square error (NMSE), b) determining 352 an accuracy ACC-2-EST-MV of the second covariance matrix CV-M-2-EST-MV related to the estimate, e.g., based on an NMSE.

Thus, in some embodiments, to measure an accuracy of the estimate $\hat{Z}_{SRS}$ to $Z_{SRS,t+p}$, a normalized mean square error (NMSE) may be used, and in some embodiments, to measure an accuracy of $\hat{R}_{y_iy_i}$ to $R_{y_iy_i}$, an NMSE for $R_{y_iy_i}$ ("RNMSE") may be used, as follows:

$$NMSE = \frac{\|w_k\hat{Z}_{SRS} - w_kZ_{SRS,t+p}\|}{\|w_kZ_{SRS,t+p}\|},$$

$$RNMSE = \frac{\|w_k\hat{Z}_{SRS}w_k^H - y_{k,t+p}y_{k,t+p}^H\|_F}{\|y_{k,t+p}y_{k,t+p}^H\|_F},$$

where $\|\cdot\|$ represents the L2-norm of a vector and $\|\cdot\|_F$ represents the Frobenius norm of a matrix.

As an example, in some embodiments, the NMSE may take the norm of the difference in the estimated and actual measurement of $y_{k,t+p}$ and normalizes it with the actual norm of $y_{k,t+p}$.

As a further example, in some embodiments, similarly, RNMSE may take the Frobenius norm of the difference in the estimated and actual covariance matrix corresponding to $y_{k,t+p}$ and normalizes it with the Frobenius norm of the actual covariance matrix corresponding to $y_{k,t+p}$.

Figure 1B:
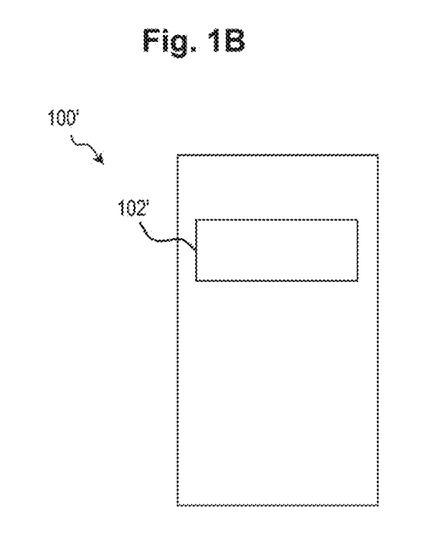

Some embodiments, FIG. 1B, relate to an apparatus 100' for a communication system 1000, the apparatus 100' comprising means 102' for determining 300 (FIG. 3) a first measurement of first reference signals associated with a first analog beam used to receive the first reference signals, determining 302 a second measurement of second reference signals associated with a second analog beam used to receive the second reference signals, determining 304 first information characterizing a digital beamformer based on the first measurement and the second measurement.

In some embodiments, FIG. 1B, the means 102' for determining the first measurement and the second measurement and for determining the first information may, e.g., comprise at least one processor 102 (FIG. 1A), and at least one memory 104 storing instructions 106 that, when executed by the at least one processor 102, cause the apparatus to perform the aforementioned aspects.

In some embodiments, FIG. 1B, the means 102' for determining the first measurement and the second measurement and for determining the first information may, e.g., comprise circuitry configured to perform one or more of the aforementioned aspects.

Some embodiments, FIG. 2, relate to a network device 10, e.g., base station, e.g., gNB, for a communication system 1000 comprising at least one apparatus 100, 100' according to the embodiments.

Some embodiments, FIG. 2, relate to a terminal device 20, e.g., UE, for a communication system 1000 comprising at least one apparatus 100, 100' according to the embodiments.

Some embodiments, FIG. 2, relate to a communication system 1000 comprising at least one of: a) an apparatus 100, 100' according to the embodiments, and/or b) a network device 10 according to the embodiments, and/or c) a terminal device 20 according to the embodiments.

Some embodiments, FIG. 3, relate to a method for a communication system 1000, comprising: determining 300 a first measurement of first reference signals associated with a first analog beam used to receive the first reference signals, determining 302 a second measurement of second reference signals associated with a second analog beam used to receive the second reference signals, determining 304 first information characterizing a digital beamformer based on the first measurement and the second measurement.

In some embodiments, the method may comprise one or more further aspects according to the embodiments.

Further embodiments, FIG. 1A, relate to a computer program comprising instructions 106 which, when the program is executed by a computer, e.g., comprising the processor 102, cause the computer to carry out at least some aspects of the method according to the embodiments.

In the following, further exemplary aspects and exemplary embodiments are disclosed, which, in some embodiments, may be combined with each other and/or with at least one of the aforementioned aspects.

In some embodiments, the hybrid beamforming HBF (FIG. 2), which uses a combination of digital beamforming DBF and analog beamforming ABF may enable to reduce cost and/or weight of apparatus 100 and/or a target device 10, 20 for the apparatus. Also, in some embodiments, a complexity and/or power consumption can be reduced by hybrid beamforming HBF, e.g. by reducing a number of RF signal processing chains.

As mentioned above, in some embodiments, a hybrid beamforming architecture may be provided which uses digital beamforming in the horizontal direction and analog beamforming in the vertical direction, e.g., because of a larger spread of UEs or users in the horizontal and relatively lower spread of users in the vertical direction. In some embodiments, a lower spread of users in the vertical direction may imply that a comparatively small number of analog beams in the vertical direction can suffice, e.g., to provide sufficient coverage in the vertical direction.

In some embodiments, a use of hybrid beamforming HBF, e.g., instead of digital beamforming, for SRS reception may result in the SRS measurements being "colored" through the lens of the analog beamformer ABF, because of additional phase shifters that may be comprised in the analog beamformer ABF.

In some embodiments, which may e.g. be used for 5G communication systems 1000, four comparatively narrow analog beams 1, 2, 3, 4 (FIG. 5) may be provided, e.g., at elevation angles {−2, −5, −8, −11} degrees.

In some examples, e.g. using conventional approaches, e.g., to determine a digital beamformer for a UE at any time, a channel estimate and the corresponding covariance matrix of at least all four analog beams would have to be determined.

In some examples, there may be a need to compute the channel and the corresponding covariance matrix of up to, e.g., 20 different beams (not shown), e.g. for a case of four analog phase shifter settings and two TRXs per column of a HBF architecture. Thus, there may be a need to compute a digital beamformer for all these analog beams, because in some embodiments, the best analog beam of a UE may keep changing with time based on varying channel conditions. In addition, in HBF, UEs may be scheduled on their second or even third or later best analog beam sometimes, e.g., to reduce the latency of waiting until the best beam of the UE is scheduled.

In some conventional approaches, a digital beamformer is determined by making as many estimations/measurements as there are analog beams, and by using a measurement done on an analog beam to be used for that analog beam alone.

By contrast, the principle according to the embodiments enables to determine the digital beamformer (or the respective first information I-1) such that, e.g., instead of making as many estimations/measurements as there are analog beams and using a measurement done on an analog beam to be used for that analog beam alone, in some embodiments, only two, for example (but not necessarily) consecutive, SRS measurements made on any two different analog beams are used.

In other words, in some embodiments, these two measurements are enough to select a digital beam for any analog beamformer thus e.g. saving on a number of measurements and avoiding latency and staleness of the estimation.

Further, in some embodiments, e.g., instead of storing covariance matrices corresponding to each analog beam, only the covariance matrix of the channel before the phase shifters can be stored and that may, in some embodiments, be subsequently used to determine the covariance matrix at the digital ports, e.g. digital input. In some embodiments, this applies to static channels as well as to time varying channels.

The invention claimed is:

1. An apparatus for a communication system, the apparatus comprising:
   at least one processor, and
   at least one memory storing instructions that, when executed by the at least one processor cause the processor to:
   determine a first measurement (RS-M-1) of first reference signals associated with a first analog beam used to receive the first reference signals (RS-1),
   determine a second measurement (RS-M-2) of second reference signals (RS-2) associated with a second analog beam used to receive the second reference signals (RS-2),
   determine first information (I-1) characterizing a digital beamformer (DBF) based on the first measurement (RS-M-1) and the second measurement (RS-M-2), wherein the instructions when executed by the at least one processor, cause the apparatus to:
   determine a measurement vector (MV) characterizing the first and second reference signals (RS-1, RS-2) based on the first measurement (RS-M-1) and the second measurement (RS-M-2),
   determine a first covariance matrix (CV-M-1) based on the measurement vector (MV),
   determine a second covariance matrix (CV-M-2), which is associated with at least one of the first analog beam and the second analog beam, based on first covariance matrix (CV-M-1),
   determine the first information (I-1) characterizing the digital beamformer (DBF) based on the second covariance matrix (CV-M-2),
   perform digital beamforming using the digital beamformer (DBF) in a first direction (DIR-1), and
   perform analog beamforming in a second direction (DIR-2), which is different from the first direction.

2. The apparatus according to claim 1, wherein the first measurement (RS-M-1) and the second measurement (RS-M-2) are consecutive measurements.

3. The apparatus according to claim 1, wherein the instructions, when executed by the at least one processor, cause the apparatus to perform at least one of:
   determining the measurement vector (MV) in accordance with $Z_{SRS}=(w^H w)^{-1} w^H y$, wherein $Z_{SRS}$ characterizes the measurement vector (MV), wherein $$y = \begin{bmatrix} y_i \\ y_k \end{bmatrix},$$

wherein $y_i$ characterizes the first measurement (RS-M-1) of the first reference signals (RS-1) associated with the first analog beam, wherein $y_k$ characterizes the second measurement (RS-M-2) of the second reference signals (RS-2) associated with the second analog beam, wherein $$w = \begin{bmatrix} w_i \\ w_k \end{bmatrix}$$

wherein $w_i$ characterizes a weight matrix associated with the first analog beam, wherein $w_k$ characterizes a weight matrix associated with the second analog beam, wherein $w^H$ is the conjugate transpose of w, wherein $(\ )^{-1}$ characterizes a matrix inversion,
   determining the first covariance matrix (CV-M-1) based on the measurement vector (MV) in accordance with: $R_{zz}=Z_{SRS}Z_{SRS}^H$, wherein $R_{zz}$ characterizes the first covariance matrix (CV-M-1), determining the second covariance matrix (CV-M-2) based on first covariance matrix (CV-M-1) in accordance with:

$$R_{y_i y_i} = w_i R_{zz} w_i^H,$$

wherein $R_{y_iy_i}$ characterizes the covariance matrix (CV-M-2) associated with at least the one of the first analog beam and the second analog beam.

4. The apparatus according to claim 1,
wherein the instructions, when executed by the at least one processor, cause the apparatus to perform at least one of:
determining, based on the first information (I-1), a digital beam (DIG-B) for exchanging, for example transmitting and/or receiving, signals,
exchanging, for example transmitting and/or receiving, signals using the digital beam (DIG-B), updating the digital beam (DIG-B).

5. The apparatus according to claim 1, wherein the instructions, when executed by the at least one processor, cause the apparatus to:
determine an estimate (EST-MV) of a measurement vector based on the first measurement (RS-M-1) and the second measurement (RS-M-2),
determine a first covariance matrix (CV-M-1-EST-MV) for the estimate (EST-MV) based on the estimate (EST-MV),
determine a second covariance matrix (CV-M-2-EST-MV) related to the estimate (EST-MV), which is associated with one of the first analog beam and the second analog beam, based on the first covariance matrix (CV-M-1-EST-MV) for the estimate (EST-MV).

6. The apparatus according to claim 5, wherein the instructions, when executed by the at least one processor, cause the apparatus to perform at least one of:
determining an accuracy (ACC-EST-MV) of the estimate (EST-MV) of the measurement vector,
determining an accuracy (ACC-2-EST-MV) of the second covariance matrix (CV-M-2-EST-MV) related to the estimate (EST-MV).

7. A terminal device for a communication system comprising at least one apparatus according to claim 1.

8. An apparatus for a communication system, the apparatus comprising:
means for determining a first measurement (RS-M-1) of first reference signals (RS-1) associated with a first analog beam used to receive the first reference signals (RS-1),
means for determining a second measurement (RS-M-2) of second reference signals (RS-2) associated with a second analog beam used to receive the second reference signals (RS-2),
means for determining first information (I-1) characterizing a digital beamformer (DBF) based on the first measurement (RS-M-1) and the second measurement (RS-M-2),
means for determining a measurement vector (MV) characterizing the first and second reference signals (RS-1, RS-2) based on the first measurement (RS-M-1) and the second measurement (RS-M-2),
means for determining a first covariance matrix (CV-M-1) based on the measurement vector (MV),
means for determining a second covariance matrix (CV-M-2), which is associated with at least one of the first analog beam and the second analog beam, based on first covariance matrix (CV-M-1),
means for determining the first information (I-1) characterizing the digital beamformer (DBF) based on the second covariance matrix (CV-M-2),
means for performing digital beamforming using the digital beamformer (DBF) in a first direction (DIR-1), and
means performing analog beamforming in a second direction (DIR-2), which is different from the first direction.

9. A network device for a communication system comprising at least one apparatus according to claim 8.

10. A method for a communication system, comprising:
determining a first measurement (RS-M-1) of first reference signals (RS-1) associated with a first analog beam used to receive the first reference signals (RS-1),
determining a second measurement (RS-M-2) of second reference signals (RS-2) associated with a second analog beam used to receive the second reference signals (RS-2),
determining first information (I-1) characterizing a digital beamformer (DBF) based on the first measurement (RS-M-1) and the second measurement (RS-M-2), wherein the method further comprises:
determining a measurement vector (MV) characterizing the first and second reference signals (RS-1, RS-2) based on the first measurement (RS-M-1) and the second measurement (RS-M-2),
determining a first covariance matrix (CV-M-1) based on the measurement vector (MV),
determining a second covariance matrix (CV-M-2), which is associated with at least one of the first analog beam and the second analog beam, based on first covariance matrix (CV-M-1),
determining the first information (I-1) characterizing the digital beamformer (DBF) based on the second covariance matrix (CV-M-2),
performing digital beamforming using the digital beamformer (DBF) in a first direction (DIR-1), and
performing analog beamforming in a second direction (DIR-2), which is different from the first direction.

* * * * *